US008413572B1

(12) United States Patent
Langenfeld et al.

(10) Patent No.: US 8,413,572 B1

(45) **Date of Patent: *Apr. 9, 2013**

(54) AUTO ATTACHMENT COUPLER WITH ABDUCTOR VALVE

(75) Inventors: Joesph W. Langenfeld, Onawa, IA (US); Neal W. Westendorf, Dakota Dunes, SD (US)

(73) Assignee: Westendorf Manufacturing, Co., Onawa, IA (US)

( * ) Notice: Subject to any disclaimer, the term of this patent is extended or adjusted under 35 U.S.C. 154(b) by 946 days.

This patent is subject to a terminal disclaimer.

(21) Appl. No.: 12/498,024

(22) Filed: Jul. 6, 2009

Related U.S. Application Data

(63) Continuation-in-part of application No. 11/603,716, filed on Nov. 22, 2006, now Pat. No. 7,559,270.

(51) Int. Cl.
*F15B 11/00* (2006.01)
*B60D 1/01* (2006.01)

(52) U.S. Cl. .......................................... 91/526; 91/527

(58) Field of Classification Search .................... 91/525, 91/526, 527
See application file for complete search history.

(56) References Cited

U.S. PATENT DOCUMENTS

| | | | | |
|---|---|---|---|---|
| 2,363,179 | A | 11/1944 | Harrington | 91/516 |
| 2,850,879 | A | 9/1958 | Schnabel | 60/413 |
| 2,892,311 | A | 6/1959 | Gerpen | 60/422 |
| 3,875,747 | A | 4/1975 | Briggs | 60/420 |
| 3,992,882 | A | 11/1976 | Bodin | 60/413 |
| 4,002,220 | A | 1/1977 | Wible | 180/421 |
| 4,254,689 | A | 3/1981 | Leonard | 91/388 |
| 4,255,126 | A | 3/1981 | Buhler | 432/1 |
| 4,265,130 | A | 5/1981 | Vural | 74/87 |
| 4,267,714 | A | 5/1981 | Repetto | 69/32 |
| 4,275,579 | A | 6/1981 | Anoshko | 72/59 |
| 4,283,990 | A | 8/1981 | Leonard | 91/47 |
| 4,293,229 | A | 10/1981 | Hehl | 366/78 |
| 4,308,745 | A | 1/1982 | Lisitsa | 72/453.18 |
| 4,309,895 | A | 1/1982 | Samuelsson | 72/457 |
| 4,310,268 | A | 1/1982 | Bower | 405/294 |
| 4,333,634 | A | 6/1982 | Malzacher | 254/106 |
| 4,366,673 | A | 1/1983 | Lapp | 60/477 |
| 4,369,907 | A | 1/1983 | Muhr | 227/54 |
| 4,373,874 | A | 2/1983 | Phillips | 417/397 |
| 4,416,313 | A | 11/1983 | Seeger | 144/193.1 |
| 4,440,450 | A | 4/1984 | Coakley | 299/17 |
| 4,479,550 | A | 10/1984 | Kuhn | 173/112 |
| 4,509,408 | A | 4/1985 | Kuroda | 92/2 |
| 4,566,673 | A | 1/1986 | Smuda | 254/84 |
| 4,580,494 | A | 4/1986 | Becker | 101/230 |
| 4,610,440 | A | 9/1986 | Casset | 269/20 |

(Continued)

*Primary Examiner* — Thomas E Lazo
(74) *Attorney, Agent, or Firm* — Dowell IP, P.C.

(57) ABSTRACT

A hydraulic system is disclosed that utilizes a switching block to selectively allow pressurized fluid to be stolen from a master or lift cylinder and directed to a single acting cylinder to perform a function, such as securing an implement to a vehicle. The system utilizes the highly pressurized hydraulic fluid from an extended lift cylinder to maintain a secondary cylinder in an extended position. To withdraw the secondary cylinder, a one-way valve directs fluid to the opposite chamber of the secondary cylinder. The secondary cylinder, however will only retract if the master cylinder is retracted and not under pressure, thus providing a significant safety benefit in certain applications. This system provides many cost efficiencies and may be utilized by work vehicles to perform secondary functions such as attaching and removing an implement from a vehicle such as, for example, a loader from a tractor.

20 Claims, 6 Drawing Sheets

U.S. PATENT DOCUMENTS 4,617,854 A 10/1986 Kropp .......... 91/517
4,622,886 A 11/1986 Imada .......... 91/520
4,624,445 A 11/1986 Putnam .......... 251/63.4
4,635,440 A 1/1987 Kropp .......... 60/422
4,768,421 A 9/1988 Schneeweiss .......... 91/497
4,779,836 A 10/1988 Marklund .......... 251/26
4,793,062 A 12/1988 Schoeck .......... 30/172
4,794,843 A 1/1989 Poling .......... 91/47
4,823,550 A 4/1989 Decker .......... 60/412
4,843,951 A 7/1989 Bruggen .......... 92/5 R
4,846,664 A 7/1989 Hehl .......... 425/589
4,871,302 A 10/1989 Clardy .......... 417/404
4,899,638 A 2/1990 Brown .......... 91/346
4,907,439 A 3/1990 Diel .......... 72/247
4,907,918 A 3/1990 Block .......... 405/303
5,000,622 A 3/1991 Block .......... 405/294
5,147,173 A * 9/1992 Fauber et al. .......... 414/723
5,193,637 A 3/1993 Lindblom .......... 180/420
5,275,540 A 1/1994 Brown .......... 417/404
5,285,641 A 2/1994 Goto .......... 60/422
5,323,822 A 6/1994 Janczak .......... 144/195.1
5,397,287 A 3/1995 Lindfors .......... 482/92
5,467,542 A * 11/1995 Hulden .......... 37/468
5,564,993 A 10/1996 Robinson .......... 476/10
5,644,836 A 7/1997 Schick .......... 29/798
5,657,725 A 8/1997 Butterfield .......... 123/90.17
5,722,605 A 3/1998 Finken .......... 241/32
5,890,871 A 4/1999 Woerman .......... 414/723
6,047,788 A 4/2000 Bohner .......... 180/406
6,065,386 A 5/2000 Rub .......... 91/31
6,070,408 A 6/2000 Clarke .......... 60/415
6,098,551 A 8/2000 Kern .......... 105/218.2
6,134,814 A 10/2000 Christy .......... 37/236
6,152,015 A 11/2000 Migliori .......... 92/52
6,155,798 A 12/2000 Deininger .......... 417/222.1
6,260,357 B1 * 7/2001 Goodfellow et al. .......... 60/470
6,266,960 B1 * 7/2001 Bibb et al. .......... 60/486
6,283,488 B1 * 9/2001 Adamek et al. .......... 91/526
6,418,717 B1 7/2002 Christiaens .......... 60/588
6,618,659 B1 9/2003 Berger .......... 701/50
6,773,223 B2 8/2004 Harris .......... 414/723
7,559,270 B2 * 7/2009 Langenfeld et al. .......... 91/526

* cited by examiner

FIG. 8
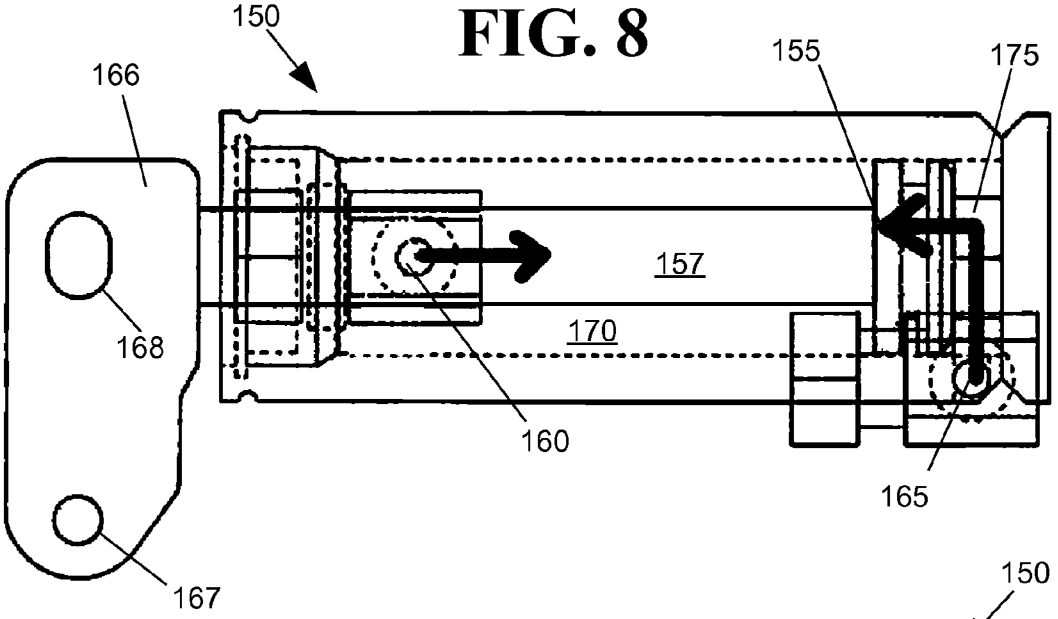
FIG. 9
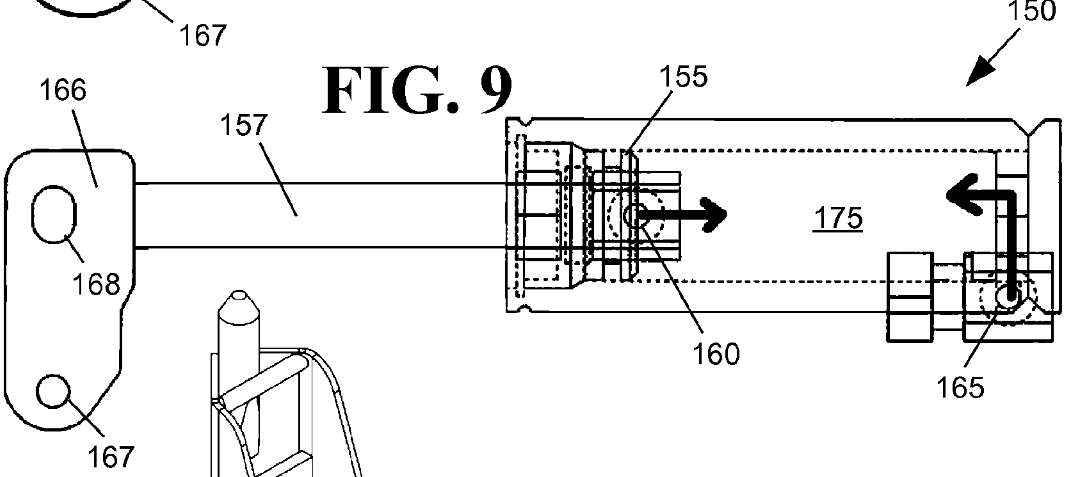
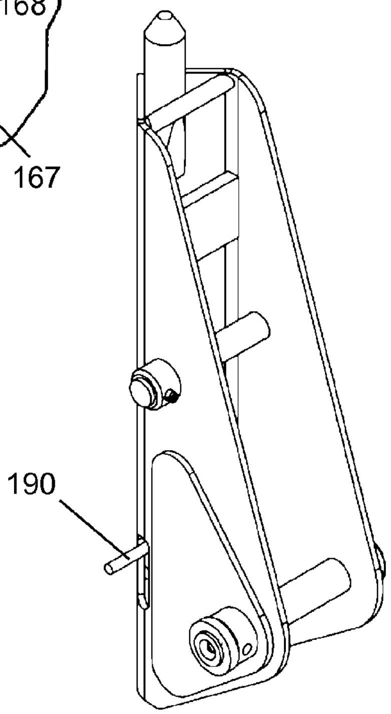
FIG. 10

AUTO ATTACHMENT COUPLER WITH ABDUCTOR VALVE

CROSS REFERENCE TO PENDING APPLICATION

This application is a continuation-in-part of and claims priority to U.S. application Ser. No. 11/603,716 entitled "Hydraulic Cylinder System" filed Nov. 22, 2006 by Joseph Langenfeld and Neal Westendorf, now issued as U.S. Pat. No. 7,559,270 the entire contents of which are herein incorporated by reference.

FIELD OF THE INVENTION

The present invention relates generally to hydraulic cylinders, and more specifically to an apparatus for integration with a tractor, skid steer, or vehicle wherein pressurized fluid is taken from a master cylinder to activate a small single acting cylinder for the performance of a secondary function.

BACKGROUND OF THE INVENTION

Work vehicles such as tractors, skid steers, four wheelers and bulldozers are often equipped with many types of attachments. Loaders are often attached to the front of such equipment with arms and hydraulic controls that allow the loader to be raised and lowered, and also rolled forward and backward. Many different implements can be attached to the front of these work vehicles allowing the operator to accomplish various tasks via a single work vehicle.

Conventional front-end loaders have a pair of lifting arms or boom assemblies that have rearward ends that pivotally attach to a tractor, and forward ends that pivotally attach to an implement. A coupler is often used to connect various implements to the lifting arms. This allows the owner of a work vehicle to change the implement attached to the work vehicle in order to address the needs of a particular job. Exemplary implements found on conventional front-end loaders include buckets, clam shells, plows, fork lifts, bale spears, etc.

Generally the arms of the loader and the attached implement are controlled by a hydraulic system. Hydraulic cylinders are provided for operating front-end loaders and their attached implements. Hydraulic lines can be found extending along the exterior (or routed along the interior) of the front-end loaders for powering the hydraulic cylinders. In addition, when attaching front-end loaders to a tractor, it is often necessary to separately and manually connect the hydraulic lines on the front-end loader to the hydraulic lines on the tractor.

The current hydraulic systems used to attach the various implements to loaders suffer from a number of drawbacks. Typically, a third function hydraulic or electric valve is required to power hydraulic couplers. Additionally, multiple hydraulic lines, components and couplings are required to perform additional functions, thereby increasing costs. Furthermore, these additional hydraulic lines must be coupled each time a loader is attached to the work vehicle.

A drawback of hydraulic systems that use diverter valves is that only a single function may be completed at a time. An improved system that allows multiple cylinders to be used and activated simultaneously is needed.

Yet another drawback of the current hydraulic systems is that the vehicle must be powered on so that the pump can provide pressurized fluid to perform a secondary function. It is desirable to be able to perform a secondary function without necessarily turning the vehicle on and going to the pump.

A primary object of the present invention is to overcome one or more of the disadvantages of the prior art hydraulic systems for work vehicles. The present invention allows secondary functions or operations to be completed while the primary use of the loader is uninterrupted. This provides the benefit of a more responsive system, since there is no time lapse while one system is waiting on the other.

Another feature of the present invention is that it provides economic savings by reducing the number of hydraulic lines, components and couplings required. The present invention also eliminates the need for a third function hydraulic or electric valve.

Yet another feature of the present invention is that it does not require an additional set of two hydraulic lines to be coupled each time a quick-mount loader is attached. Furthermore, this results in a more cost efficient system because additional lines back to the pump are no longer required.

An additional feature of the present invention is that the single acting cylinder can be activated without going to the pump or turning the tractor on, as long as the loader is off the ground or the lift cylinder is under pressure. Here the power comes from the weight of the loader and the things attached to it.

Previous systems for remotely decoupling implements to loader arms have suffered from safety problems in that the implement could be accidently decoupled when in a dangerous position. In an embodiment of the present invention, a dual acting cylinder is utilized instead of the single acting cylinder and the pressurized fluid used to raise the loader arms is directed to a secondary coupling cylinder. In this configuration, the secondary coupling cylinder is extended whenever the main cylinder is pressurized, keeping an implement locked to the loader arms. To unlock the implement, a one-way valve directs fluid to the opposite chamber of the secondary coupling cylinder to retract the secondary coupling cylinder. The secondary coupling cylinder, however, will only retract if the master cylinder is not under pressure. This provides a significant safety benefit because an implement may not be unlocked when in an elevated position.

In remotely coupling an implement to a loader, it may be difficult for an operator to accurately determine if the connection cylinder is properly secured to the implement. In the present invention, the coupler pin may be connected to a flag that moves with the coupler pin. The flag may include a horizontal rod that has been painted to assist the loader operator determine that the coupler pin is secured.

SUMMARY OF THE INVENTION

The preferred embodiment of the present invention provides an improved hydraulic cylinder system that utilizes a master cylinder under pressure to power a single acting cylinder to perform a function. Fluid is taken from the master cylinder by a single acting cylinder so that both cylinders can perform tasks simultaneously. Once the secondary function is complete and the single acting cylinder is no longer receiving pressurized fluid, the single acting cylinder is forced to retract causing the fluid to flow back through the hydraulic conduit and into the backside of the master cylinder.

The second preferred embodiment of the present invention provides an improved hydraulic cylinder system that utilizes a master or lift cylinder under pressure to power a single acting cylinder to perform a function. Fluid is taken from the master cylinder and directed to a single acting cylinder. Other embodiments utilize a dual acting cylinder. Once the secondary function is complete and the single acting cylinder is no longer receiving pressurized fluid, a spring causes the single acting cylinder to retract forcing the fluid to flow back through the hydraulic conduit and into the backside of the master cylinder.

In a third preferred embodiment, the present invention is modified for use on a tractor, skid steer, construction truck, construction machinery, or vehicle. For example, the secondary cylinder may steal pressurized fluid from a lift cylinder to perform a secondary function such as connecting or disconnecting an implement to a front-end loader, or locking or unlocking a frond-end loader to the vehicle. Other uses of the secondary cylinder are contemplated by the inventor and are within the scope of the present invention.

A fourth preferred embodiment incorporates a switching block and solenoid valve wherein the switching block and the solenoid valve direct a portion of the pressurized fluid away from the lift cylinder to power the single acting cylinder.

A fifth preferred embodiment incorporates a check valve. The check valve is connected to the lift cylinder. The check valve only allows fluid to flow into the non-pressurized side of the lift cylinder. Further, the check valve only allows the fluid to return to the lift cylinder when that cylinder side is not pressurized, sometimes causing the oil to remain inside the single acting cylinder.

A sixth preferred embodiment modifies the current system so that when the lift cylinder is under pressure, the single acting cylinder will work without going to the pump or turning on the tractor.

A seventh preferred embodiment utilizes a dual compartment secondary cylinder instead of a single acting cylinder. The dual acting cylinder is maintained in a first position by hydraulic fluid stolen from the master cylinder as it is raised or maintained in an elevated position. The high pressure of the fluid needed to raise the loader arms prevents the dual acting cylinder from accidentally being actuated into a second position where an implement could be decoupled from the loader arms.

The preferred embodiments offer cost efficiencies, less and smaller hydraulic lines and additional functionality in a hydraulic system. This and other advantages will become apparent as this specification is read in conjunction with the accompanying drawings and appended claims.

BRIEF DESCRIPTION OF THE DRAWINGS

FIG. 8 is a diagram of a fully refracted coupler cylinder extends to a fully actuated position when hydraulic fluid is provided to a lift chamber of a master cylinder. The coupler cylinder also includes a flag system to assist an operator in determining whether or not the coupler cylinder is extended.

FIG. 9 is a diagram of a hydraulic cylinder of FIG. 8 in a fully actuated position.

FIG. 10 is a perspective view of a secondary cylinder having a flag extending out perpendicular to a piston rod for indicating whether the cylinder is in an extended or refracted configuration.

DETAILED DESCRIPTION

The present invention may be used with any vehicle having at least one master, lift or implement cylinder and at least one, small single acting cylinder. Although the preferred embodiment of the present invention is intended and adapted for use with a tractor or skid steer, those of skill in the art will recognize that the present invention is equally adaptable for use with other utility vehicles and for use in other applications using multiple cylinders to perform multiple functions. However, for descriptive purposes, the present invention will be described for use on a tractor or skid steer.

Figure 1:
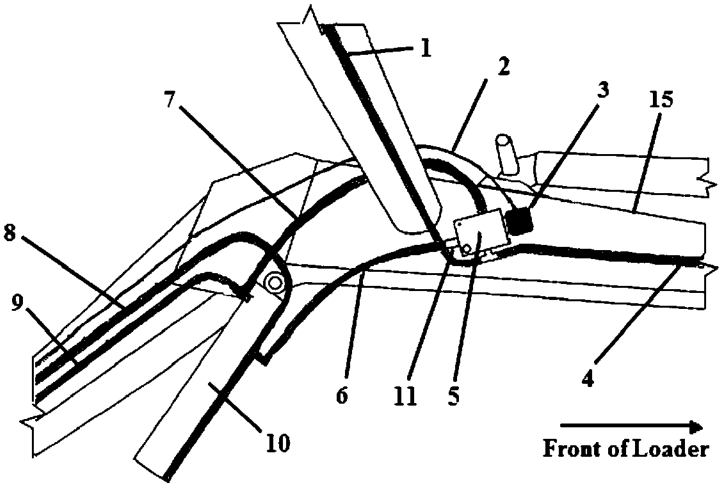
FIG. 1 is a side view of the improved hydraulic system displaying a lift cylinder connected to the switching block.

FIG. 1 shows the conduits of the present hydraulic system connecting the lift cylinder 10 to the switching block 5. The major components shown in FIG. 1 include a lift cylinder 10, a switching block 5, a solenoid 3, a lifting arm 15, an electrical line 2, hydraulic conduits 1 and 4 connecting to a single acting cylinder 21 (shown in FIG. 4), conduits 8 and 9 connecting to a hydraulic pump (not shown) and conduits 6 and 7 connecting the switching block 5 and the lift cylinder 10.

Figure 2:
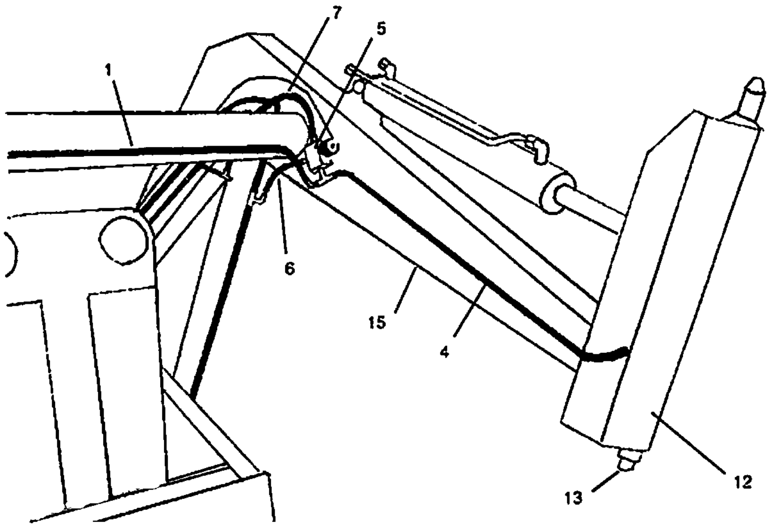
FIG. 2 is a perspective view showing the switching block connected to a coupler at the distal end of the lifting arms of a tractor.

FIG. 2 shows the hydraulic system of the present invention connected to moveable lifting arms 15 of a tractor. The major components shown in FIG. 2 include the hydraulic conduits 1, 4, 6 and 7, coupler 12 and peg 13.

Figure 3:
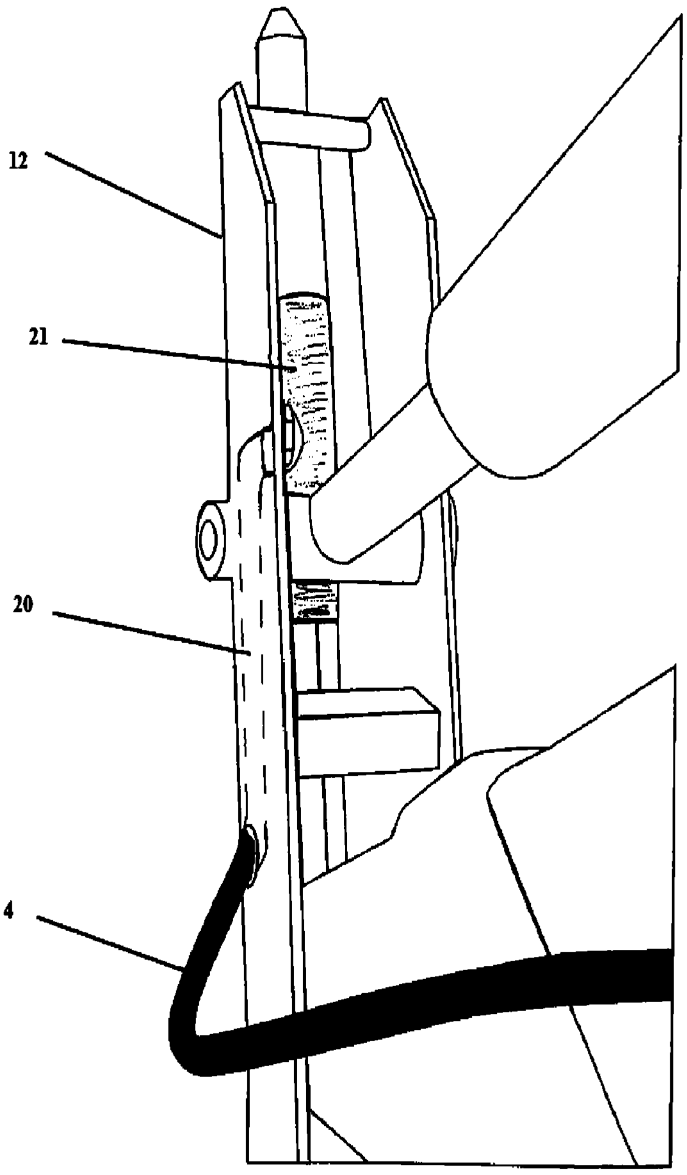
FIG. 3 is a view of a coupler, including the single acting cylinder.

FIG. 3 shows a view of coupler 12 with the single acting hydraulic cylinder 21. The major components of FIG. 3 include hydraulic conduit 4, tube 20 and the single acting cylinder 21.

Figure 4:
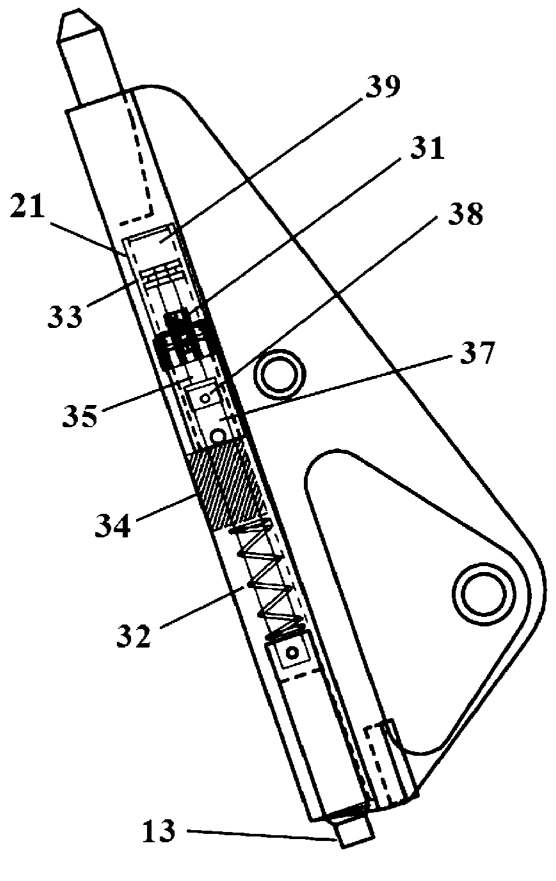
FIG. 4 is a view of a single acting cylinder.

FIG. 4 shows a single acting cylinder 21. The major components of FIG. 4 include a port 31, a piston 33, a piston rod 35, a stationary block 34, a spring 32, a bar 37, an air-port 38, an air space 39 and a peg 13.

Figure 5:
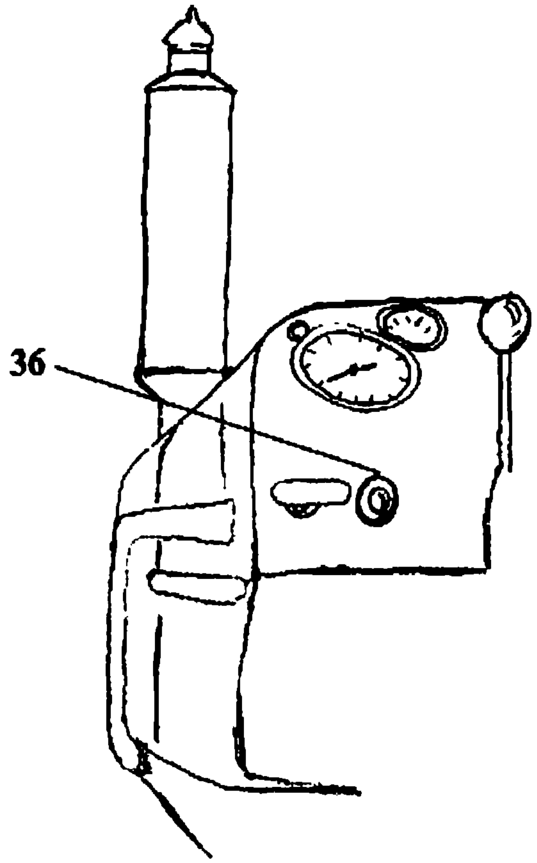
FIG. 5 is a view of the dashboard of a tractor with a switch to activate the solenoid of the switching block.

FIG. 5 shows a perspective view of the dashboard of a tractor, including switch 36.

As shown in FIG. 1, hydraulic conduit 6 connects the lift cylinder 10 to the switching block 5. It should be understood that the name "lift cylinder" is used because of the placement of the cylinder on the loader assembly and its function to raise and lower the loader assembly. However, the lift cylinder 10 can be used for different applications. The name "lift cylinder" is used as a matter of convenience and does not limit how the cylinder is used. It should also be understood that the lift cylinder 10 may be referred to as a "master cylinder" because it describes the cylinder that is providing the pressurized fluid to the single acting cylinder 21.

It should be understood that the name "single acting cylinder" is used because the pressurized fluid is provided to one side of the cylinder. Typically when the fluid pressure is cut-off, the single acting cylinder will hold its normal position. The cylinder can be returned to the retracted position by an opposing force, such as a spring or an external load.

Hydraulic conduit 9 carries pressurized fluid to the lift cylinder 10. Line 2 is an electrical line, which connects the solenoid 3 to the dashboard of the tractor. A switch 36 (FIG. 5) on the dashboard allows the solenoid 3 to be activated from the seat of the tractor. When the solenoid 3 is activated, the switching block 5 allows the conduit 6 to steal pressurized fluid from the lift cylinder 10. The switching block 5 directs pressurized fluid through the conduits 1 and 4 to their respective single acting cylinders 21 located at the end of each lifting arm 15 of the tractor. Since the single acting cylinder 21 is relatively small compared to the lift cylinder 10, both the lift cylinder 10 and the single acting cylinder 21 can operate at the same time. The minor volume of fluid stolen from the lift cylinder 10 has no adverse effects on the operation of the lift cylinder.

When the single acting cylinder 21 is no longer receiving pressurized fluid, a spring 32 forces the single acting cylinder 21 to re-track, reversing the flow of the once pressurized fluid. The fluid re-tracks back through the same hydraulic conduits 1 and/or 4 to the switching block 5, where the fluid is routed through the conduit 7 to check valve 11. At check valve 11 the fluid is only allowed to flow into (and not out of) the backside of the non-pressurized side of the lift cylinder 10. Finally, conduit 8 returns oil to the reservoir and pump (not shown).

FIG. 2 shows the hydraulic system connected to the moveable lifting arms 15 of a tractor. Conduit 1 crosses the front of the tractor to the corresponding lifting arm on the other side (not shown). Conduit 4 connects to and provides pressurized fluid to the single acting cylinder 21 (see FIG. 4) located inside the coupler 12. Peg 13 allows the coupler 12 to connect to an implement (not shown).

FIG. 3 shows a coupler 12 with the single acting hydraulic cylinder 21. The single acting cylinder 21 receives pressurized oil through conduit 4. Tube 20 conceals the conduit 4 as it connects to the single acting hydraulic cylinder 21.

FIG. 4 shows the single acting cylinder 21 wherein pressurized fluid is received via conduit 1 or 4 (not shown) through port 31. The pressurized fluid causes the piston 33 to move into the air space 39. The piston 33 is connected to the piston rod 35, which is connected to a bar 37 which extends through the stationary block 34, and connects to peg 13. As the piston 33 receives pressurized fluid, the piston 33 extends/actuates, forcing the air in the air space 39 through a hole (not shown) through the center of the piston rod 35 where it escapes through the air-port 38. The movement of piston 33 forces the peg 13 to retract/actuate (although those with skill in the art will recognize that the orientation of the cylinder 21 and the arrangement of the spring 32 can be modified so that the peg 13 extends). When the pressurized fluid is cut off, the spring 32 expands from stationary block 34, forcing the piston 33 to retract/actuate and moving the corresponding peg 13 back to its original position. The ability to extend and retract the peg 13 of the coupler 12 allows the coupler 12 to attach and detach various implements (not shown) to the lifting arms 15 of the tractor.

FIG. 5 shows a perspective view of the dashboard of a tractor. Switch 36 allows the switching block 5 to be operated from the seat of the tractor. Once the switch 36 is activated, the single acting cylinder 21 will cause the peg 13 to retract. Once the switch 36 is no longer activated the spring 32 causes the peg 13 to return to its original position. This arrangement provides an added safety feature as the peg 13 will only remain retracted so long as the switch 36 is activated. Therefore, any accidental loss of hydraulic pressure will not cause an implement to detach.

The switch 36 also allows the operator to perform various functions, such as connecting and disconnecting implements to the lifting arms of the tractor without leaving the seat. The switch and hydraulic system of the present invention can also be used to lock and unlock a quick mount loader to and from the tractor. The secondary cylinder may also be utilized for other functions where a smaller cylinder is needed, but it is not practical or efficient to utilize a dedicated fluid conduit from the hydraulic pump to the smaller cylinder.

Figure 6:
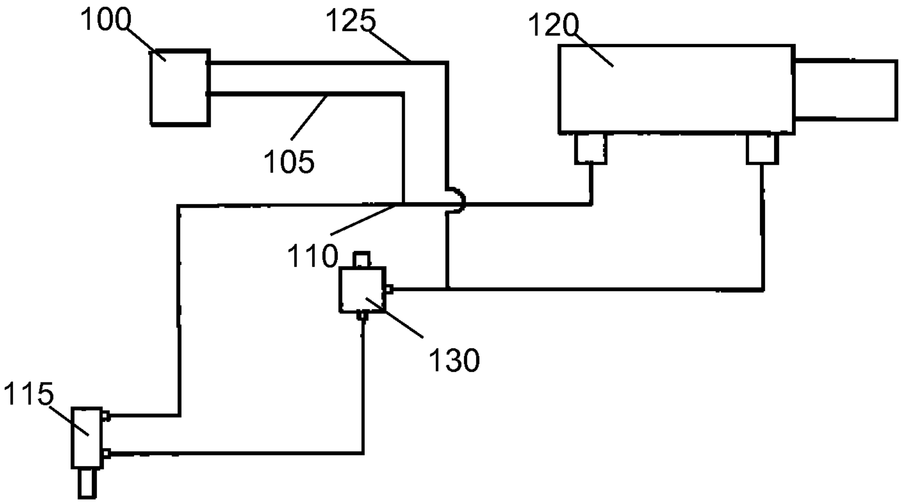
FIG. 6 is a schematic view of a hydraulic system structured such that extension of a master cylinder always extends a coupler cylinder while refraction of the coupler cylinder only occurs if the master cylinder is refracting and an abductor valve is activated.

FIG. 6 shows an example of a hydraulic system with a pressurized hydraulic fluid provider 100, such as a hydraulic reservoir/pump combination, that transmits hydraulic fluid through a first conduit 105 to a junction point 110. At the junction point 110 a portion of the hydraulic fluid flowing to the first chamber/compartment of a master/lift cylinder 120 is abducted to a first chamber/compartment of a coupler cylinder 115, or secondary cylinder. The diversion of hydraulic fluid at the junction point is substantially unregulated such that if the first chamber of the lift cylinder is pressurized with hydraulic fluid, the first chamber of the coupler cylinder will also be pressurized. A second conduit 125 provides hydraulic fluid to the second chambers of the lift and coupler cylinders. An electrically controlled fluid abductor valve 130, or abductor block, selectively allows hydraulic fluid to flow to the second chamber of the coupler cylinder when a signal is received from a controller.

In an exemplary example of the system, the hydraulic system is used with a front end loader. Pressurization of the first chamber of the lift cylinder raises the loader arms and pressurization of the first chamber of the coupler cylinder secures an implement to the loader arms. If a loader operator unintentionally activates the abductor valve and attempts to release the coupler cylinder while the implement is in a substantially elevated orientation, the pressure in the first chamber of the coupler cylinder will prevent the release of the implement. In the example, only when the implement is in a safe position, such as on the ground, will the first chamber of the coupler cylinder be unpressurized so that the implement may be released from the loader arms.

Figure 7:
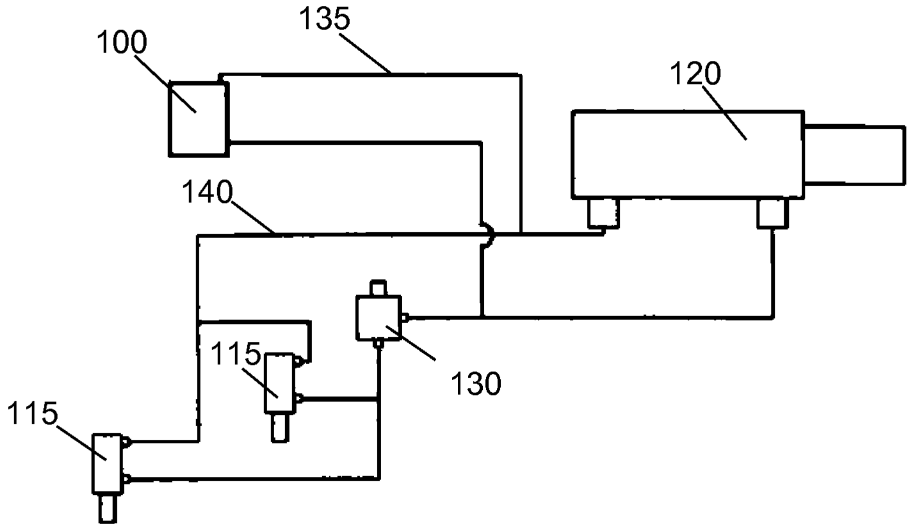
FIG. 7 is a schematic view of a hydraulic system structured such that extension of a master cylinder always extends a plurality of coupler cylinders while refraction of the coupler cylinders only occurs if the master cylinder is refracting and an abductor valve is activated.

In the system shown in FIG. 7 a portion of the hydraulic fluid transmitted to positively actuate the master cylinder is stolen by a thief hydraulic fluid line to pressurize the first chambers of a plurality of coupler cylinders. Hydraulic fluid is transmitted through a second conduit to negatively actuate the lift cylinder 120. An abductor valve 130 selectively steals a portion of the hydraulic fluid bound for the second chamber of the lift cylinder and transmits it to the second chambers of the plurality of coupler cylinders.

In another embodiment of the conduit system, the hydraulic fluid used to negatively actuate the coupler cylinders is directly stolen from the second chamber of the lift cylinder. In yet another embodiment of the hydraulic system, each of the plurality of coupler cylinders is attached to a unique loader arm of a front end loader.

FIG. 8 illustrates an example of a secondary cylinder 150 with a slidable piston 155, a piston rod 157, a first hydraulic fluid port 160, and a second hydraulic fluid port 165 providing pressurized hydraulic fluid from the lift chamber of a master cylinder when the master cylinder is extended. The piston rod connects to a tab 166 that has a flag connection 167 and a coupler pin connection 168. Hydraulic fluid from the first hydraulic fluid port is provided to a first hydraulic fluid chamber 170 while hydraulic fluid form the second hydraulic fluid port flows into a second hydraulic fluid chamber 175. As a result of both second hydraulic port directly stealing hydraulic fluid from the master cylinder, the piston is maintained in a fully actuated position when hydraulic fluid is provided to the master cylinder.

FIG. 9 illustrates an example of a secondary cylinder 150 with a piston in a fully extended state separating the first and second expandable compartments. Pressurized fluid from the lift chamber of the master cylinder provided to the second hydraulic fluid port keeps the port in piston rod in the fully actuated position even if a loader operator were to accidentally attempt to retract the coupler cylinder while the master cylinder was elevating a load.

In an exemplary embodiment, two secondary cylinders are utilized to couple an implement to the loader arms of a front end loader. While the implement is in use, the secondary cylinders are maintained in a fully actuated position by hydraulic fluid from the second hydraulic port. If a front end loader operator unintentionally attempts to disconnect the implement while it is elevated, hydraulic fluid will be provided to the first hydraulic port and the piston will be maintained in the fully actuated position such that the implement remains safely secured to the loader arms. In order to release the implement from the loader arms, the implement is pressed against the ground such that pressurized hydraulic fluid is provided to a the lowering chamber of the master cylinder and a portion of that hydraulic fluid is selectively stolen from by a thief block to provide fluid to the first hydraulic port of the secondary cylinder. The operator of the cylinder is able to tell that the secondary cylinder has been retracted by then movement of a flag piece connecting to the tab of the secondary cylinder.

In another embodiment of the hydraulic cylinder system, a dual-acting cylinder with standard hydraulic ports is used so that hydraulic fluid may always be provided to the first and second chambers regardless of the position of the piston. By supplying hydraulic fluid to both chambers, neither chamber needs to be vented to the atmosphere to prevent the creation of a vacuum. Utilizing a sealed system also helps to prevent oil leaks and also helps to prevent dirt and debris from entering the cylinder.

In yet another embodiment of the hydraulic system, flags connected to the piston shafts of the secondary hydraulic cylinders are included to help a loader operator determine that the secondary cylinder has been extended and the implement is properly secured to the loader arms. As shown in FIG. 10, a flag 190 in the form of a colored horizontal bar extends out from the connection between the piston rod and the coupling pin. The flag is stationary and perpendicularly oriented relative to the piston rod of the cylinder. In other embodiments, the flag may include structures that pivot or rotate as the coupler pin moves from a coupled to uncoupled orientation.

Other alterations, variations, and combinations are possible that fall within the scope of the present invention. Although the preferred embodiment of the present invention has been described, those skilled in the art will recognize other modifications that can be made that would nonetheless fall within the scope of the present invention. Therefore, the present invention should not be limited to the apparatus and method described. Instead, the scope of the present invention should be consistent with the invention claimed below.

The inventors contemplate several alterations and improvements to the disclosed invention. Other materials and methods of manufacture will be obvious to those of reasonable skill in the art and are within the scope of the invention. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the apparatus described. Instead, the scope of the present invention should be consistent with the invention claimed below.

We claim:

1. A hydraulic system having a hydraulic pump connected to hydraulic conduits, wherein the hydraulic pump is connected to pump hydraulic fluid through the hydraulic conduits, wherein the hydraulic system further comprises:

a master cylinder connected to the conduits of the hydraulic system so as to be powered by the hydraulic pump;

a controller operated fluid abductor valve;

a secondary cylinder substantially mobile relative to the master cylinder and hydraulically connected to the master cylinder via the fluid abductor valve;

wherein pressurized fluid is provided to the master cylinder;

wherein some of the pressurized fluid is directed to the secondary cylinder.

2. The hydraulic system of claim 1 further comprising:

a single hydraulic line connecting the fluid abductor valve to the secondary cylinder.

3. The hydraulic system of claim 1 wherein the secondary cylinder is used to attach or remove an implement to or from an implement lifting arm.

4. The hydraulic system of claim 1 wherein actuation of the master cylinder elevates the secondary cylinder relative to the master cylinder.

5. The hydraulic system of claim 1 wherein the master cylinder and the secondary cylinder each includes a piston separating a first and second compartment, the first compartment of the secondary cylinder is always provided with pressurized fluid when the first compartment of the master cylinder is provided with pressurized fluid, and the fluid abductor valve selectively provides fluid to the second compartment of the secondary cylinder when the second compartment of the master cylinder is provided with pressurized fluid.

6. The hydraulic system of claim 1 wherein the secondary cylinder is one of a plurality of auxiliary cylinders substantially mobile relative to the master cylinder and hydraulically connected to the master cylinder via the fluid abductor valve;

wherein some of the pressurized fluid is directed to each of the plurality of auxiliary cylinders.

7. The hydraulic system of claim 1 further comprising:

the master cylinder including a first and second master chamber respectively provided with hydraulic fluid via a first and second master conduit;

a first abductor conduit abducting, from at least one of the first master conduit or the first master chamber, a portion of the hydraulic fluid to the secondary cylinder when the master cylinder is in a positively actuated state;

a second abductor conduit abducting, from at least one of the second master conduit or the second master chamber, a portion of the hydraulic fluid to the fluid abductor valve when the master cylinder is in a negatively actuated state; and the fluid abductor valve selectively pressurizing one of a first and second secondary chambers of the secondary cylinder, upon receipt of a signal from a controller, by transmitting hydraulic fluid to the secondary cylinder.

8. The hydraulic system of claim 1 further comprising:

the master cylinder including a first and second master chamber;

the secondary cylinder includes a piston rod secured to a piston separating a first and second compartment, the piston slidable to between a first position and a second position, a first hydraulic conduit provides hydraulic fluid to both the first master chamber and the first compartment;

a second hydraulic conduit provides hydraulic fluid to both the second master chamber and the fluid abductor valve; and a flag connecting to and stationary relative to the piston rod for indicating if the piston is in the first position or the second position.

9. A tractor, skid steer, construction device, or vehicle with a hydraulic system including a hydraulic pump and a hydraulic fluid reservoir connected to hydraulic conduits, wherein the hydraulic pump is connected to pump hydraulic fluid from the reservoir through the hydraulic conduits, wherein the hydraulic system further comprises:

a primary cylinder connected to the conduits of the hydraulic system so as to be powered by the hydraulic pump;

an abductor block;

an auxiliary cylinder, substantially mobile relative to the primary cylinder and connected to the primary cylinder via the abductor block;

wherein pressurized fluid is provided to the primary cylinder;

wherein some of the pressurized fluid is stolen by the auxiliary cylinder so that the primary cylinder and the auxiliary cylinder can perform functions simultaneously.

10. The tractor, skid steer, construction device, or vehicle of claim 9 wherein the primary cylinder is substantially separated from the auxiliary cylinder.

11. The tractor, skid steer, construction device, or vehicle of claim 9 wherein some of the pressurized fluid is stolen by the auxiliary cylinder during both an extension and a retraction of the primary cylinder so that the primary cylinder and the auxiliary cylinder can perform functions simultaneously.

12. The tractor, skid steer, construction device, or vehicle of claim 9 wherein the primary cylinder and the auxiliary cylinder each includes a first and second expandable compartment, the first expandable compartment of the auxiliary cylinder is always provided with hydraulic fluid when the first expandable compartment of the primary cylinder is provided with hydraulic fluid, and the abductor block selectively provides hydraulic fluid to the second expandable compartment of the auxiliary cylinder when the second expandable compartment of the primary cylinder is provided with hydraulic fluid.

13. The tractor, skid steer, construction device, or vehicle of claim 9 further comprising a secondary cylinder, substantially mobile relative to the primary cylinder, the abductor block selectively provides hydraulic fluid to a first expandable compartment of the secondary cylinder;

wherein some of the pressurized fluid is stolen by the secondary cylinder so that the primary cylinder and the secondary coupler cylinder can perform functions simultaneously.

14. The tractor, skid steer, construction device, or vehicle of claim 13 wherein both the secondary cylinder and the auxiliary cylinder secure an implement to the tractor, skid steer, construction device, or vehicle.

15. A system for a controller operating a secondary cylinder with hydraulic fluid stolen from a master cylinder operable in both a positively actuated state and a negatively actuated state, the system comprising:

a master cylinder including a first and second master chamber respectively provided with hydraulic fluid from a reservoir via a first and second master conduit;

a first abductor conduit abducting, from at least one of the first master conduit or the first master chamber, a portion of the hydraulic fluid to a secondary cylinder when the master cylinder is in the positively actuated state;

a second abductor conduit abducting, from at least one of the second master conduit or the second master chamber, a portion of the hydraulic fluid to an abductor valve when the master cylinder is in a negatively actuated state; and the abductor valve selectively pressurizing the secondary cylinder, upon receipt of a signal from the controller, by transmitting hydraulic fluid to the secondary cylinder.

16. The system of claim 15 wherein the secondary cylinder includes a piston rod secured to a piston separating a first and second compartment, the piston slidable between a first position and a second position, the first abductor conduit provides hydraulic fluid to the first compartment of the secondary cylinder when the piston is in both the first position and the second position, the second abductor conduit provides hydraulic fluid to the first compartment of the secondary cylinder when the piston is in the first position, and a flag connecting to and stationary relative to the piston rod for indicating if the piston is in the first position or the second position.

17. The system of claim 16 wherein the flag includes a moveable bar perpendicularly oriented relative to the piston rod.

18. The system of claim 15 wherein the master cylinder and the secondary cylinder each includes a piston separating a first and second compartment, the first compartment of the secondary cylinder is continually provided with hydraulic fluid when the first compartment of the master cylinder is provided with hydraulic fluid, and the abductor valve selectively provides fluid to the second compartment of the secondary cylinder only upon receipt of the signal from the controller while the second compartment of the master cylinder is provided with hydraulic fluid.

19. The system of claim 15 wherein the abductor valve includes a controller regulated one-way valve.

20. The system of claim 15 wherein the secondary cylinder is substantially mobile relative to the master cylinder and hydraulically connected to the master cylinder via the abductor valve.

* * * * *